United States Patent
Gavlik

(12) United States Patent (10) Patent No.: US 7,073,077 B1
(45) Date of Patent: Jul. 4, 2006

(54) APPARATUS FOR CUTTING POWER TO PROCESSING CIRCUITRY IN A NETWORK INTERFACE

(75) Inventor: John E. Gavlik, Oxnard, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 439 days.

(21) Appl. No.: 10/435,490

(22) Filed: May 9, 2003

(51) Int. Cl.
*G06F 1/26* (2006.01)
*G06F 1/32* (2006.01)

(52) U.S. Cl. .................. 713/300; 713/324
(58) Field of Classification Search ........ 713/300, 713/324
See application file for complete search history.

(56) References Cited

U.S. PATENT DOCUMENTS

| | | | |
|---|---|---|---|
| 5,991,885 A * | 11/1999 | Chang et al. | 713/300 |
| 6,026,492 A * | 2/2000 | Cromer et al. | 726/35 |
| 6,295,356 B1 * | 9/2001 | De Nicolo | 379/413 |
| 6,496,103 B1 * | 12/2002 | Weiss et al. | 375/257 |
| 6,535,983 B1 * | 3/2003 | McCormack et al. | 713/310 |
| 6,571,181 B1 * | 5/2003 | Rakshani et al. | 702/60 |
| 6,702,622 B1 * | 3/2004 | Sato et al. | 439/676 |
| 2003/0061522 A1 * | 3/2003 | Ke et al. | 713/300 |

* cited by examiner

*Primary Examiner*—Thomas Lee
*Assistant Examiner*—Ji H. Bae

(57) ABSTRACT

A network interface that consumes no power when it is not connected to an external network. The network interface comprises: i) a data transceiver for transmitting data to and receiving data from an external network coupled to the network interface; ii) a connection jack into which a cable connection plug may be inserted, wherein the connection jack couples a data line from the data transceiver to a corresponding data line in the cable connection plug; and iii) a switch associated with the connection jack for connecting an externally received power supply voltage to the data transceiver. The switch is in an open position when the cable connection plug is not inserted into the connection jack. Insertion of the cable connection plug into the connection jack closes the switch to thereby supply power to the data transceiver.

20 Claims, 2 Drawing Sheets

APPARATUS FOR CUTTING POWER TO PROCESSING CIRCUITRY IN A NETWORK INTERFACE

TECHNICAL FIELD OF THE INVENTION

The present invention is generally directed to a networked processing system and, in particular, to an apparatus for reducing power consumption in a processing system when it is not connected to a network.

BACKGROUND OF THE INVENTION

In recent years, there have been great advancements in the speed, power, and complexity of integrated circuits, such as application specific integrated circuit (ASIC) chips, random access memory (RAM) chips, microprocessor (uP) chips, and the like. These advancements have made possible the development of system-on-a-chip (SOC) devices. A SOC device integrates into a single chip all (or nearly all) of the components of a complex electronic system, such as a wireless receiver (i.e., cell phone, a television receiver, and the like). SOC devices greatly reduce the size, cost, and power consumption of the overall system.

Minimizing the power consumption of a processing system is becoming particularly important to consumers. Many popular electronic devices are portable systems that operate on battery power. Since maximizing battery life is a critical design objective in a portable device, it is essential to minimize the power consumption of the electronic device. Furthermore, even if an electronic device is not a portable system, minimizing power consumption is still an important objective. The increased use of a wide variety of electronic products by consumers and businesses has caused corresponding increases in the electric utility bills of homeowners and business operators. The increased use of electronic products also is a major contributor to the increased electrical demand that has caused highly publicized power shortages in the United States, particularly California.

Many popular business and consumer electronic products are capable of communicating via an external network, such as the Internet. Typically, these products use a network interface card (NIC) to connect to and communicate over the external network. An Ethernet NIC is one of the most common network interface cards and is used to communicate via the Internet. An Ethernet NIC may be used in portable processing systems, such as laptop personal computers, and stationary processing systems, such as desktop computers, servers, Internet phones, copy machines, printers, and the like.

Each processing system that hosts a network interface card (NIC) must supply the application specific integrated circuit (ASIC) chip in the NIC with multiple supply voltages that power the ASIC chip. However, a processing system that is capable of communicating over an external network does not always use the external network, even when it is connected to the external network. In order to avoid wasting power, it is desirable to minimize the power drain of a NIC when the external network is not being used. This is especially true for battery-powered processing systems, such as laptop computers, since the power drain of the NIC shortens battery life.

There are a number of detection schemes that automatically power down the ASIC chip(s) in a NIC when it appears that no data traffic is active on the external network connection. These schemes are generally referred to as "wake on LAN" and are implemented by many Ethernet NIC manufactures. However, a small, but significant, power drain still occurs in the ASIC chip(s) of the NIC. Monitoring circuits that keep the NIC circuitry minimally active in case the network suddenly becomes active or the user re-enables the telecommunication abilities of the NIC cause this power drain. It is preferable to completely eliminate this power drain when the processing system and NIC are not coupled to an external network at all.

Therefore, there is a need in the art for improved apparatuses for reducing power consumption in network-capable processing systems. In particular, there is a need for an apparatus that completely shuts off power to the components of a NIC when the NIC is not connected to an external network.

SUMMARY OF THE INVENTION

To address the above-discussed deficiencies of the prior art, it is a primary object of the present invention to provide a network interface that consumes no power when it is not connected to an external network. The network interface of the present invention may be implemented as a distinct network interface card that is inserted into a host device. Alternatively, the network interface of the present invention may be implemented as an integral part of the host device, such as by integration onto the motherboard of the host device.

According to an advantageous embodiment of the present invention, the network interface comprises: i) a data transceiver capable of transmitting data to and receiving data from an external network coupled to the network interface; ii) a connection jack into which a cable connection plug may be inserted, wherein the connection jack is operable to couple a data line from the data transceiver to a corresponding data line in the cable connection plug; and iii) a switch associated with the connection jack capable of connecting an externally received power supply voltage to the data transceiver. The switch is in an open position when the cable connection plug is not inserted into the connection jack. Insertion of the cable connection plug into the connection jack closes the switch to thereby supply power to the data transceiver.

According to one embodiment of the present invention, the switch is capable of connecting a plurality of externally received power supply voltages to the data transceiver.

According to another embodiment of the present invention, the connection jack is an RF-45 connection jack.

According to still another embodiment of the present invention, the network interface further comprises a Wake On LAN controller.

According to yet another embodiment of the present invention, the switch is capable of connecting the externally received power supply voltage to the Wake On LAN controller and wherein insertion of the cable connection plug into the connection jack closes the switch to thereby supply power to the Wake On LAN controller.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
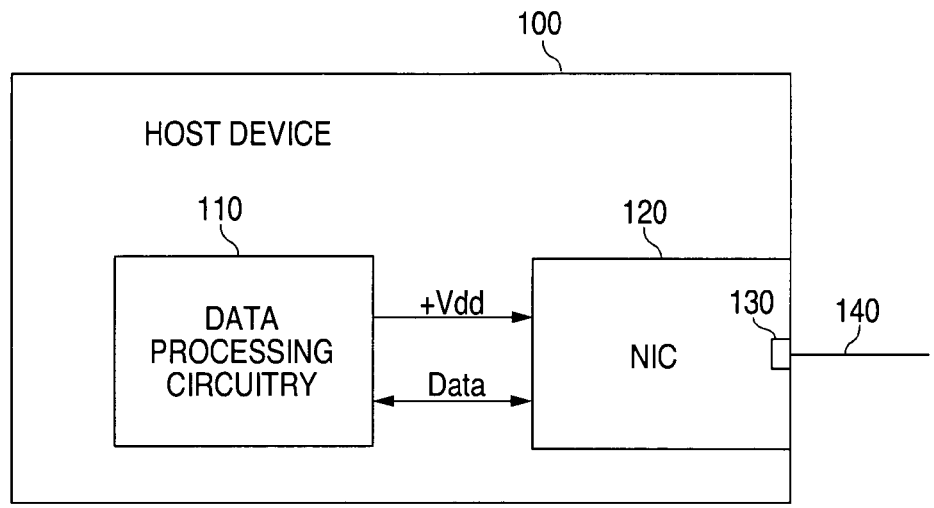
FIG. 1 illustrates an exemplary host device containing a network interface card (NIC) according to one embodiment of the present invention.
Figure 2:
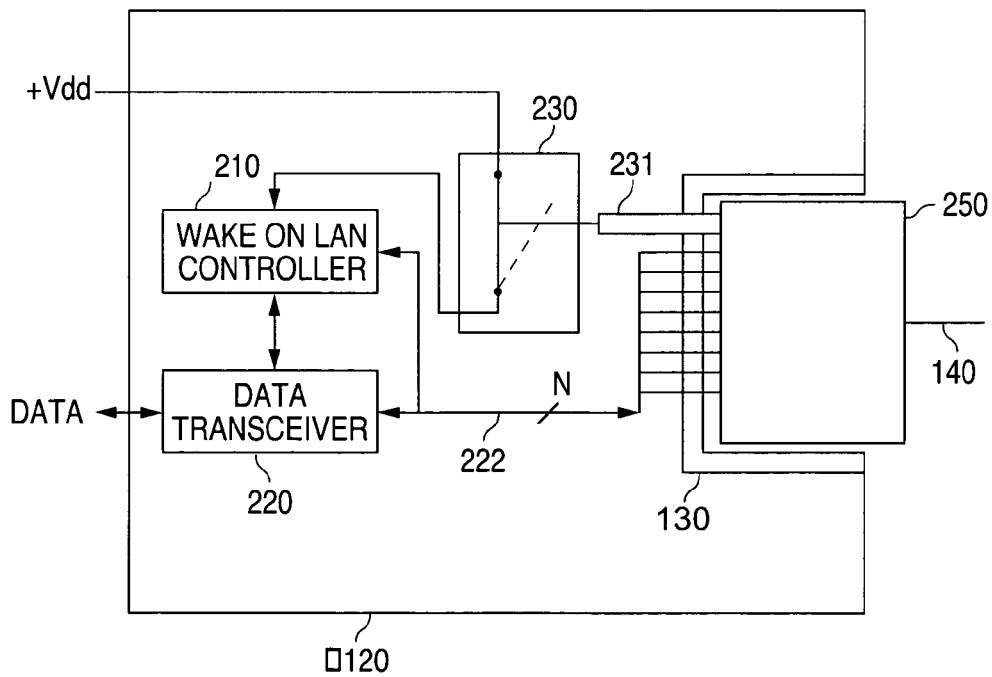
FIG. 2 illustrates the network interface card (NIC) in greater detail according to a first embodiment of the present invention.
Figure 3:
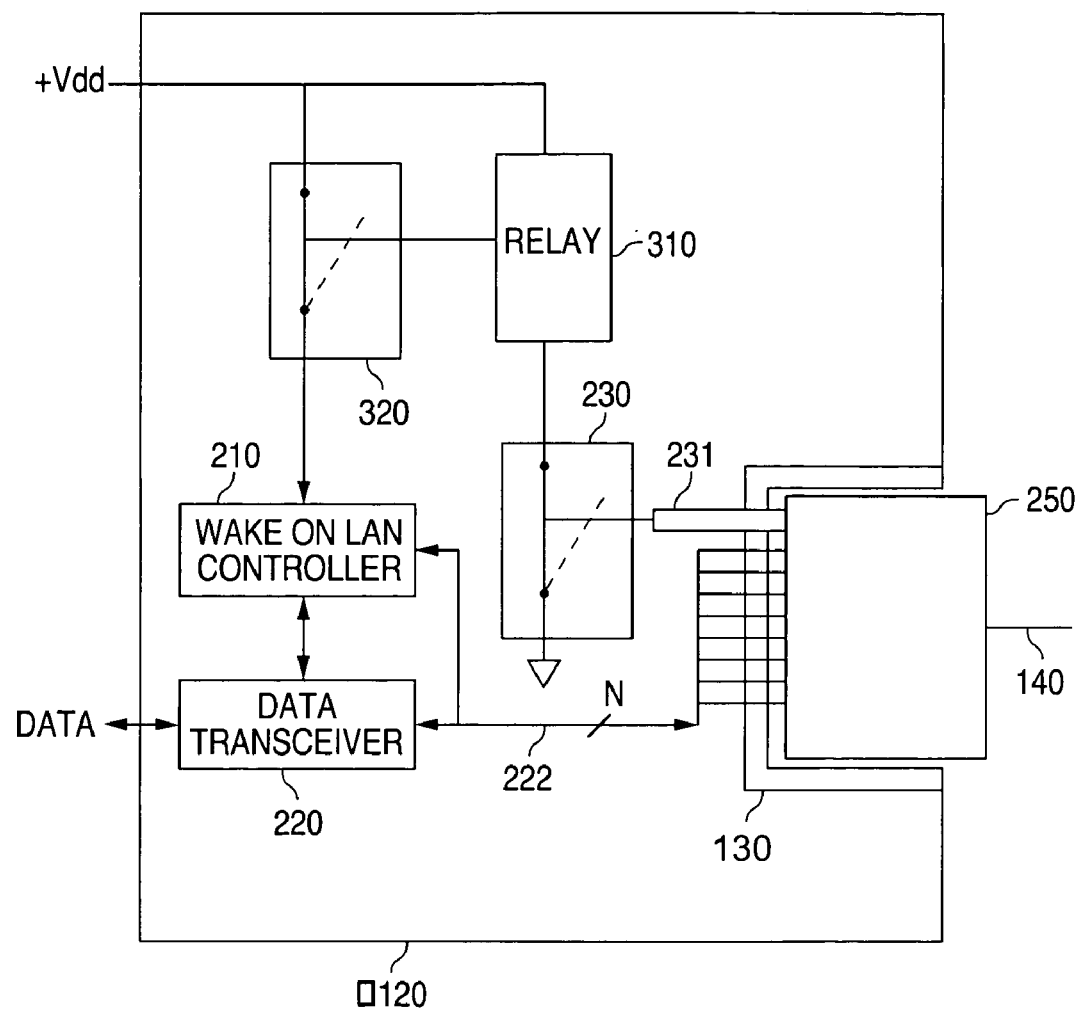
FIG. 3 illustrates the network interface card (NIC) in greater detail according to a second embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged network interface.

In the description that follows, the present invention is implemented as a distinct network interface card (NIC) that may be inserted into a host device. However, this is by no means necessary and should not be construed so as to limit the scope of the present invention. In an alternative embodiment, a network interface according to the principles of the present invention may be implemented as an integral part of the host device, such as by integration onto the motherboard of the host device.

FIG. 1 illustrates exemplary host device 100, which contains a network interface card (NIC) according to one embodiment of the present invention. Host device 100 comprises data processing circuitry 110 and network interface card (NIC) 120. NIC 120 comprises network connection jack 130, which receives network cable 140. Data processing circuitry 110 provides one or more power supply voltages (represented collectively as +Vdd power supply) to NIC 120. The +Vdd power supply voltages power the application specific integrated circuit (ASIC) chips in NIC 120. Data processing circuitry 110 also transmits data to, and receives data from, NIC 120. In turn, NIC 120 transmits data to, and receives data from, an external network (not shown) via network cable 140.

Host device 100 is intended to be a generic representation of a wide range of electronic products that are capable of communicating via an external network. Host device 100 includes, but should not be construed as limited to, portable computers (i.e., laptops), desktop computers (or workstations), network servers, any type of Internet telephony device, printers, copy machines, and the like. Network interface card (NIC) 120 provides host device 100 with network capability. According to the principles of the present invention, the power consumption of NIC 120 goes to zero when network cable 140 is not inserted into network connection jack 130.

FIG. 2 illustrates network interface card (NIC) 120 in greater detail according to a first embodiment of the present invention. NIC 120 comprises network connection jack 130, Wake On LAN controller 210, data transceiver 220, data lines 222, switch 230, and switch control 231. Cable connection plug 250 terminates the end of network cable 140 and is shown inserted into network connection jack 130. According to an exemplary embodiment of the present invention, network connection jack 130 may be an RJ-45 connection jack and cable connection plug 250 may be an RJ-45 plug. N data lines from cable connection plug 250 are connected to data transceiver 220 and/or Wake On LAN controller 210.

According to the principles of the present invention, all of the +Vdd supply voltages received by NIC 120 must pass through the contacts of switch 230 in order to reach the ASIC circuitry of Wake On LAN controller 210 and data transceiver 220. Thus, switch 230 may operate as a kill switch with respect to Wake On LAN controller 210 and data transceiver 220. According to an exemplary embodiment of the present invention, if the +Vdd supply voltages comprise more than one power supply voltage, then switch 230 comprises multiple switches that are opened and closed in unison by switch control 231.

According to the principles of the present invention, switch control 231 only closes if cable connection plug 250 is inserted into network connection jack 130. If cable connection plug 250 is removed from network connection jack 130, a spring or a similar mechanism coupled to switch control 231 returns switch 230 to the open position (indicated by dashed line), thereby cutting off the +Vdd supply voltage(s) to Wake On LAN controller 210 and data transceiver 220.

According to an exemplary embodiment of the present invention, switch control 231 may be any conventional pressure operated mechanism that controls a mechanical switch, including, for example, a lever, a toggle, a push-rod, a button, or the like. When cable connection plug 250 is removed from network connection jack 130, no pressure is applied to switch control 231 and switch control 231 is extended by the spring (or other mechanism) into the opening of network connection jack 130, thereby opening switch 230. When cable connection plug 250 is reinserted into network connection jack 130, switch control 231 is depressed by cable connection plug 250, thereby closing switch 230.

FIG. 3 illustrates network interface card (NIC) 120 in greater detail according to a second embodiment of the present invention. NIC 120 in FIG. 3 differs from NIC 120 in FIG. 2 in only a few respects. Relay 310 and switch 320 have been added to NIC 120 in FIG. 3. According to the second embodiment of the present invention, switch 230 may be a microswitch that is unable to carry the current loads of the ASICs in Wake On LAN controller 210 and data transceiver 220.

To compensate for this, switch 230 instead uses relay 310 to close switch 320. Relay 310 is coupled to one of the voltage supplies in the +Vdd supply voltage(s). Switch 230 provides a ground path for relay 310. When switch 230 is closed, relay 310 is energized and relay 310 closes switch 320. When switch 320 closes, the +Vdd supply voltages are coupled to Wake On LAN controller 210 and data transceiver 220.

According to the principles of the present invention, all of the +Vdd supply voltages received by NIC 120 must pass through the contacts of switch 320 in order to reach the ASIC circuitry of Wake On LAN controller 210 and data transceiver 220. Thus, switch 230, relay 310, and switch 320 operate as a kill switch with respect to Wake On LAN controller 210 and data transceiver 220. According to an exemplary embodiment of the present invention, if the +Vdd supply voltages comprise more than one power supply voltage, then switch 320 comprises multiple switches that are opened and closed in unison by relay 310.

Although the present invention has been described with an exemplary embodiment, various changes and modifications may be suggested to one skilled in the art. It is intended that the present invention encompass such changes and modifications as fall within the scope of the appended claims.

What is claimed is:

1. A network interface comprising:
   a data transceiver capable of transmitting data to and receiving data from an external network coupled to said network interface;
   a connection jack into which a cable connection plug may be inserted, wherein said connection jack is operable to couple a data line from said data transceiver to a corresponding data line in said cable connection plug; and
   a switch associated with said connection jack capable of connecting an externally received power supply voltage to said data transceiver, wherein said switch is in an open position when said cable connection plug is not inserted into said connection jack and wherein insertion of said cable connection plug into said connection jack closes said switch to thereby supply power to said data transceiver, and wherein the externally received power supply voltage is not received via the connection jack.

2. The network interface as set forth in claim 1 wherein said switch is capable of connecting a plurality of externally received power supply voltages to said data transceiver.

3. The network interface as set forth in claim 1 wherein said connection jack is an RF-45 connection jack.

4. The network interface as set forth in claim 1 wherein said network interface further comprises a Wake On LAN controller.

5. The network interface as set forth in claim 4 wherein said switch is capable of connecting said externally received power supply voltage to said Wake On LAN controller and wherein insertion of said cable connection plug into said connection jack closes said switch to thereby supply power to said Wake On LAN controller.

6. A host device capable of communicating with an external network, said host device comprising:
   data processing circuitry capable of transmitting data to and receiving data from said external network; and
   a network interface capable of transferring data between said data processing circuitry and said external network, said network interface comprising:
      a data transceiver capable of transmitting data to and receiving data from said external network;
      a connection jack into which a cable connection plug may be inserted, wherein said connection jack is operable to couple a data line from said data transceiver to a corresponding data line in said cable connection plug; and
      a switch associated with said connection jack capable of connecting an externally received power supply voltage received from said host device to said data transceiver, wherein said switch is in an open position when said cable connection plug is not inserted into said connection jack and wherein insertion of said cable connection plug into said connection jack closes said switch to thereby supply power to said data transceiver, and wherein the externally received power supply voltage is not received via the connection jack.

7. The host device as set forth in claim 6 wherein said switch is capable of connecting a plurality of externally received power supply voltages to said data transceiver.

8. The host device as set forth in claim 6 wherein said connection jack is an RF-45 connection jack.

9. The host device as set forth in claim 6 wherein said network interface further comprises a Wake On LAN controller.

10. The host device as set forth in claim 9 wherein said switch is capable of connecting said power supply voltage received from said host device to said Wake On LAN controller and wherein insertion of said cable connection plug into said connection jack closes said switch to thereby supply power to said Wake On LAN controller.

11. A host device capable of communicating with an external network, said host device comprising:
    data processing circuitry including at least one power supply connection and capable of transmitting data to and receiving data from said external network; and
    a network interface capable of transferring data between said data processing circuitry and said external network, said network interface comprising:
       a data transceiver capable of transmitting data to and receiving data from said external network;
       a connection jack into which a cable connection plug may be inserted, wherein said connection jack is operable to couple a data line from said data transceiver to a corresponding data line in said cable connection plug; and
       a switch associated with said connection jack capable of connecting an externally received power supply voltage received from the power supply connection to said data transceiver, wherein said switch is in an open position when said cable connection plug is not inserted into said connection jack and wherein insertion of said cable connection plug into said connection jack closes said switch to thereby supply power to said data transceiver and wherein the externally received power supply voltage is not received via the connection jack.

12. The host device as set forth in claim 11 wherein said switch is capable of connecting a plurality of power supply voltages to said data transceiver.

13. The host device as set forth in claim 11 wherein said connection jack is an RF-45 connection jack.

14. The host device as set forth in claim 11 wherein said network interface further comprises a Wake On LAN controller.

15. The host device as set forth in claim 14 wherein said switch is capable of connecting said power supply voltage received from said host device to said Wake On LAN controller and wherein insertion of said cable connection plug into said connection jack closes said switch to thereby supply power to said Wake On LAN controller.

16. The host device as set forth in claim 11 wherein the host device is a computer system.

17. The host device as set forth in claim 11 wherein the host device is a telephony device.

18. The host device as set forth in claim 11 wherein the host device is a printer.

19. The host device as set forth in claim 6 wherein the host device is a computer system.

20. The host device as set forth in claim 6 wherein the host device is a printer.

* * * * *